United States Patent [19]

Herre et al.

[11] Patent Number: 5,736,943
[45] Date of Patent: Apr. 7, 1998

[54] METHOD FOR DETERMINING THE TYPE OF CODING TO BE SELECTED FOR CODING AT LEAST TWO SIGNALS

[75] Inventors: Jürgen Herre, Buckenhof; Bernhard Grill, Lauf; Ernst Eberlein, Grossenseebach; Karlheinz Brandenburg; Dieter Seitzer, both of Erlangen, all of Germany

[73] Assignee: Fraunhofer-Gesellschaft zur Forderung der Angewandten Forschung e.V., Munich, Germany

[21] Appl. No.: 557,046
[22] PCT Filed: Jul. 8, 1994
[86] PCT No.: PCT/EP94/02250
  § 371 Date: May 31, 1996
  § 102(e) Date: May 31, 1996
[87] PCT Pub. No.: WO95/08227
  PCT Pub. Date: Mar. 23, 1995

[30] Foreign Application Priority Data

Sep. 15, 1993 [DE] Germany ............ 43 31 376.0
Apr. 22, 1994 [DE] Germany ............ 43 45 171.3

[51] Int. Cl.⁶ .................................. D03M 7/00
[52] U.S. Cl. .................... 341/50; 341/106; 381/2; 395/2.09
[58] Field of Search ............ 341/50, 106; 381/2; 395/2.09

[56] References Cited

U.S. PATENT DOCUMENTS 5,278,909  1/1994  Edgar .......................... 381/17
5,285,498  2/1994  Johnston ........................ 381/2
5,530,750  6/1996  Akagiri .......................... 380/4
5,535,300  7/1996  Hall, II et al. ............. 395/2.36
5,581,654  12/1996  Tsutsui ...................... 395/2.39

FOREIGN PATENT DOCUMENTS

0559383A1  2/1993  European Pat. Off. .
4136825    3/1993  Germany .............. H03M 7/30

Primary Examiner—Jeffrey A. Gaffin
Assistant Examiner—Jason L. W. Kost
Attorney, Agent, or Firm—Dougherty & Dremann

[57] ABSTRACT

In the case of coding a plurality of signals which are not independent of one another, a selection of the suitable type of coding is made as a function of a similarity measure.

According to one aspect of the invention, the similarity measure is determined by firstly coding one of the signals according to the intensity-stereo method and then decoding it in order to create a signal affected by coding error, whereupon the latter signal and the associated non-coded signal are transformed into the frequency domain. In the frequency domain, a selection or evaluation of the actually audible spectral components, as well as of the signal affected by coding error and of the associated signal not affected by coding error, is undertaken using a listening threshold which is determined by a psycho-acoustic calculation. Intensity-stereo coding is undertaken in the case of a high similarity measure, whereas otherwise a separate coding of the channels is performed.

9 Claims, 7 Drawing Sheets f/t-ANALYSIS

HIGH-RESOLUTION t/f- ANALYSIS USING A HYBRID/POLYPHASEFILTERBANK

| Fs=32 kHz | | | | | | Polyphase Implem. | | |
|---|---|---|---|---|---|---|---|---|
| Hybrid | | | | | | Start | Stop | Sum. |
| SB # | Lines | SB start | Start Freq. | Stop Freq. | Bandwidth | Polybd. | Polybd. | Length |
| 1 | 4 | 0 | 0,00 | 111,11 | 111,11 | | | |
| 2 | 4 | 4 | 111,11 | 222,22 | 111,11 | | | |
| 3 | 4 | 8 | 222,22 | 333,33 | 111,11 | | | |
| 4 | 4 | 12 | 333,33 | 444,44 | 111,11 | | | |
| 5 | 4 | 16 | 444,44 | 555,56 | 111,11 | | | |
| 6 | 4 | 20 | 555,56 | 666,67 | 111,11 | | | |
| 7 | 6 | 24 | 666,67 | 833,33 | 166,67 | | | |
| 8 | 6 | 30 | 833,33 | 1000,00 | 166,67 | | | |
| 9 | 8 | 36 | 1000,00 | 1222,22 | 222,22 | | | |
| 10 | 10 | 44 | 1222,22 | 1500,00 | 277,78 | 2 | 3 | 6 |
| 11 | 12 | 54 | 1500,00 | 1833,33 | 333,33 | 3 | 4 | 6 |
| 12 | 16 | 66 | 1833,33 | 2277,78 | 444,44 | 4 | 5 | 6 |
| 13 | 20 | 82 | 2277,78 | 2833,33 | 555,56 | 5 | 6 | 6 |
| 14 | 24 | 102 | 2833,33 | 3500,00 | 666,67 | 6 | 7 | 6 |
| 15 | 30 | 126 | 3500,00 | 4333,33 | 833,33 | 7 | 9 | 3 |
| 16 | 38 | 156 | 4333,33 | 5388,89 | 1055,56 | 9 | 11 | 3 |
| 17 | 46 | 194 | 5388,89 | 6666,67 | 1277,78 | 11 | 13 | 3 |
| 18 | 56 | 240 | 6666,67 | 8222,22 | 1555,56 | 13 | 16 | 2 |
| 19 | 68 | 296 | 8222,22 | 10111,11 | 1888,89 | 16 | 20 | 2 |
| 20 | 84 | 364 | 10111,11 | 12444,44 | 2333,33 | 20 | 25 | 2 |
| 21 | 102 | 448 | 12444,44 | 15277,78 | 2833,33 | 25 | 31 | 2 |
| | 26 | 550 | 15277,78 | 16000,00 | 722,22 | | | |
| | | 576 | 16000,00 | | | | | |

*FIG. 7*

METHOD FOR DETERMINING THE TYPE OF CODING TO BE SELECTED FOR CODING AT LEAST TWO SIGNALS

BACKGROUND OF THE INVENTION

1. Field of the Invention

The invention relates to a method for determining the type of coding to be selected for coding at least two signals, in which each signal is transformed into the frequency domain and, starting from the spectral values, a similarity measure is determined for the similarity of in each case at least two signals.

In particular, the invention relates to an optimized coding selection for coding two or more signals of which at least two are not independent of one another but contain at least partially redundant or irrelevant information.

2. Description of the Prior Art

In general, in methods for data-reduced coding of digital audio signals the signals are initially transformed from the time domain into the frequency domain. If signals are concerned which are not independent of one another, it is customary to use data-reduced coding which takes account of the redundancy between the two or the plurality of channels.

Such coding has become known as so-called centre/side coding (J. D. Johnston, "Perceptual Transform Coding of Wideband Stereo Signal", IC ASSP, IEEE, 1989, pages 1993 to 1996). In this centre/side coding, on the basis of the left and right channels the sum or centre of the stereo signals is coded, on the one hand, and the difference or side of the stereo signals is coded, on the other hand.

A further type of coding, which has meantime become customary, is the intensity-stereo method which is described in a publication entitled "Subband Coding of Stereophonic Digital Audio Signals", Proc. of the IC ASSP, 1991, IEEE, Toronto, pages 3601 to 3604. In the intensity-stereo method, on the basis of the two channels a monosignal is formed and transmitted with a supplementary information item by the left/right distribution of the signal.

It has already been stated in the applicant's German Patent DE 41 36 825 C1 that in such methods strong interference can occur if the signals have only a relatively slight similarity or are even completely independent of one another. Thus, it is known that a strongly differing composition of the signals in the left and right channels leads in the case of centre/side coding to artifacts which cannot be masked by the signal actually present in the channel. When using the intensity-stereo method, destruction of the spatial sound impression can occur if the left and right channels have spectral values deviating substantially from one another.

In order to face this problem, it is proposed in this printed document to use the spectral values of the signals transformed into the frequency domain to determine a similarity measure on the basis of which switching-over between different types of coding is undertaken. If the spectral values produce a high similarity measure, centre/side coding is used in the method described there, while in the case of a low similarity measure, and thus in the case of a low spectral similarity of the channels under consideration, separate coding of the channels is undertaken. It is likewise known from this patent to use the signals to be coded to calculate the masking threshold by means of a psychoacoustic model, said masking threshold being used to drive a data-reducing stage which is connected downstream of the centre/side coding stage and achieves a data reduction while taking account of the masking.

In its Claim 15, which refers back indirectly to Claim 8, DE 41 36 825 C1 describes only the use of a masking threshold in determining the spectral values which can be set to zero.

Although the method disclosed in German Patent 41 36 825 already achieves a considerable quality enhancement by comparison with unchanged centre/side coding methods and by comparison with unchanged intensity-stereo methods, a further enhancement of the quality of the data to be transmitted is desirable in the case of further reduction of the data rate.

It is therefore the object of the invention, starting from this prior art, to develop a method for determining the type of coding to be selected for coding at least two signals in such a way that a further data reduction is achieved in conjunction with improving the quality of the coded data or improving the quality of the signals decoded on the basis of these data.

SUMMARY OF THE INVENTION

In accordance with the first aspect of the invention, not only is a frequency transformation undertaken of the two signals, which are to be coded according to one of two types of coding, in order to generate corresponding spectral values, but at the same time at least one of the signals is subjected to that type of coding which is used in the case of the determination of a high similarity measure, and is then decoded again in order to generate at least one signal which is affected by coding error and is then likewise transformed into the frequency domain. A listening threshold determined by a psycho-acoustic calculation is then used to select or evaluate the respective, actually audible spectral components, starting both from the spectral values of the signal affected by coding error and from the spectral values of the signal associated with this signal affected by coding error. Subsequently, the similarity measure, on the basis of which one of the at least two types of coding is selected, is calculated on the basis of the audible spectral components, thus selected, at least of the signal affected by coding error and of the associated signal.

In accordance with the second aspect of the invention, not only is a frequency transformation undertaken of the two signals, which are to be coded according to one of two types of coding, in order to generate corresponding spectral values, but at the same time at least one of the signals is subjected after its transformation into the frequency domain to that type of coding which is used in the case of the determination of a high similarity measure, and is then decoded again in order to generate at least one signal which is affected by coding error. A listening threshold determined by a psychoacoustic calculation is then used to select or evaluate the respective, actually audible spectral components, starting both from the spectral values of the signal affected by coding error and from the spectral values of the signal associated with this signal affected by coding error. Subsequently, the similarity measure, on the basis of which one of the at least two types of coding is selected, is calculated on the basis of the audible spectral components, thus selected or evaluated, at least of the signal affected by coding error and of the associated signal.

By contrast with the prior art, the invention thus makes use of psychoacoustic evaluation both of the spectral components of a signal and of the spectral components of a corresponding signal which is affected by a coding error, such as occurs in the case of the data-reducing type of coding, in order to undertake a selection of one of at least two types of coding.

In accordance with the third aspect of the invention, starting from the spectral values of two signals which correspond, for example, to two different channels, a selection or evaluation of the actually audible spectral components is undertaken using a listening threshold determined by a psychoacoustic calculation, whereupon the similarity measure, by means of which one of at least two types of coding is selected, is determined on the basis of the audible spectral components, thus selected or evaluated, of the at least two signals. By contrast with the prior art, this approach of the invention also uses the listening threshold determined by a psychoacoustic calculation not, or at least not only, for the purpose of data reduction of the coded signal, but for the determination of the similarity measure by means of which the selection of the type of coding is undertaken. This concept, which is common to the three aspects of the invention, contrasts clearly with the present state of the art and permits selection of the type of coding from psychoacoustic points of view.

Preferred developments of the method according to the invention are laid down in the subclaims.

BRIEF DESCRIPTION OF THE DRAWINGS

Preferred exemplary embodiments of devices for carrying out the methods according to the invention are explained in more detail below with reference to the attached drawings, in which:

FIG. 7 shows a table for illustrating the mode of operation and structure of a hybrid or polyphase filter bank for carrying out transformation, matched to the characteristics of human hearing, with unequal time/frequency resolution.

DESCRIPTION OF THE PREFERRED EMBODIMENTS

Figure 1A:
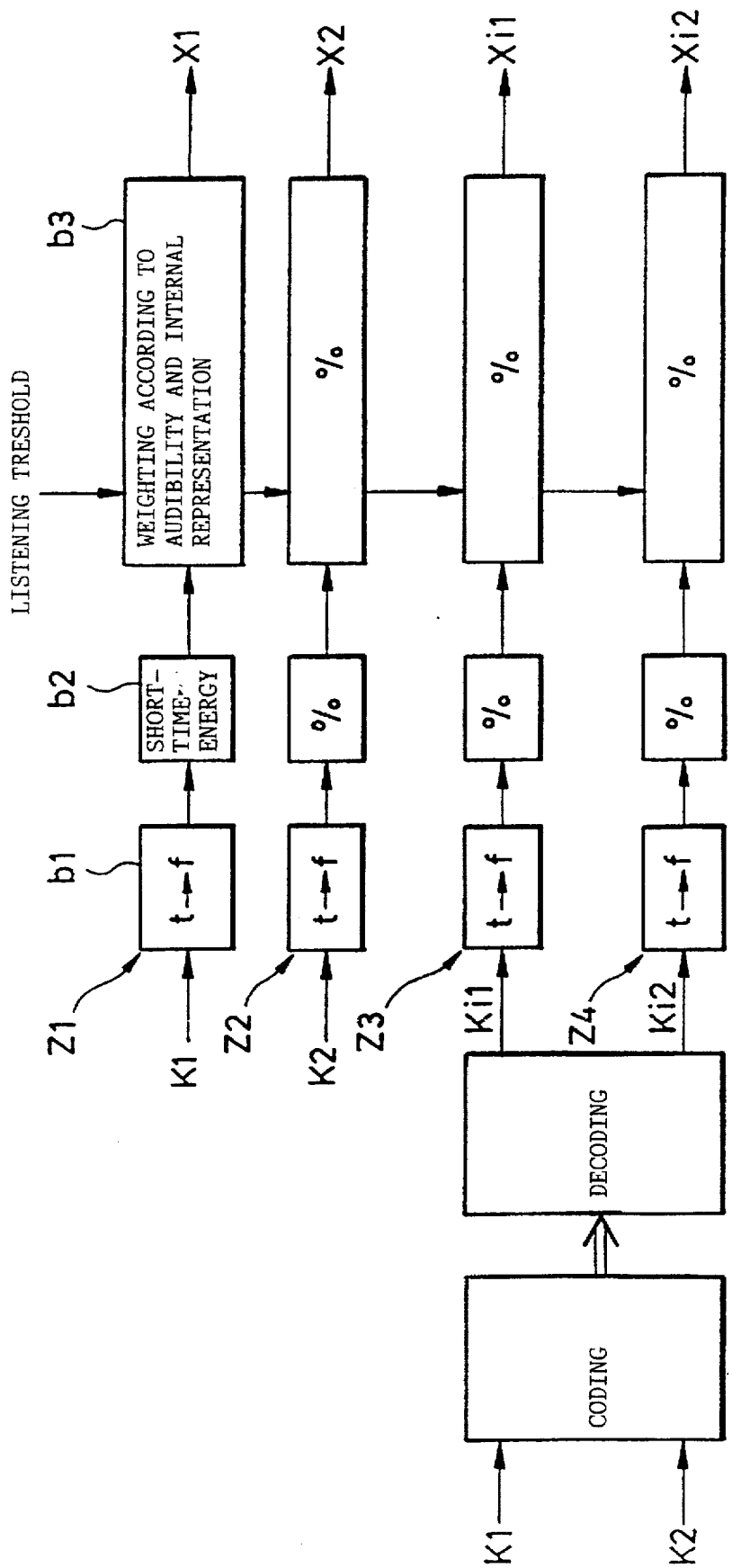
FIG. 1a shows a first exemplary embodiment of a device for carrying out essential parts of the method for determining the type of coding to be selected.

FIG. 1a shows the block diagram of a device for carrying out essential parts of the method according to the first aspect of the invention in order to determine the type of coding to be selected. The exemplary embodiment shown here can be used to control switching-over between separate coding of two stereo channels k1, k2 and coding according to the "Intensity-stereo coding method", which is to be gathered per se from the printed publication quoted at the beginning.

However, it may already be emphasized at this juncture that the methods according to the invention are suitable not only for selecting either separate coding of two stereo channels k1, k2 or coding of the channels according to the intensity-stereo method, but also serve to select a type of coding from at least two arbitrary types of coding of which one is better suited than the other, non-selected type for coding signals which have a certain similarity to one another, as a result of which a relatively high bit reduction is achieved. The application of the methods according to the invention as they are explained in detail below is not restricted to coding stereo signals, for example in accordance with ISO/MPEG layers 1 to 3, but is also suitable, for example, for multichannel coding such as can be undertaken, for example, in accordance with MPEG 2.

As is illustrated in FIG. 1a, the device shown there contains four signal processing branches z1, z2, z3, z4, of which each one has three corresponding blocks b1, b2, b3.

Block b1 is used for the time/frequency transformation of the discrete time signal k1, k2, ki1, ki2 on the input side. Consideration is given here to arbitrary frequency transformation methods, known per se, for transforming the audio data on the input side from the time domain into the frequency or spectral domain. Consideration is given to methods such as, for example, FFT, DCT, MDCT, and the use of a polyphase filter bank or a hybrid filter bank.

However, as is explained below in greater detail, the invention preferably uses a transformation method having unequal time and frequency resolutions which is adapted to the characteristics of human hearing. In the case of such a method, such as is known per se in the field of psychoacoustics, only the lower frequency groups have a corresponding width, while the width of frequency groups increases starting from a specific frequency, as will be further explained in detail with reference to the table in FIG. 7. The time resolution decreases with increasing frequency group width in accordance with the Heisenberg limit of 0.5 for the product of the frequency group width and time resolution.

In the second block b2, the spectral values obtained by transformation are converted, for example by squaring and summation over the corresponding times, into short-time energy values for the individual frequency group bands. The short-time energy values thus obtained for the individual frequency group widths are selected or evaluated in the third block b3 using a listening threshold which is derived from a psychoacoustic calculation for the relevant signal, in order to extract from the real energies only the actually audible components for the purpose of taking account of psychoacoustic masking effects. Even if this is not mandatory for the purposes of the invention, it is further possible in block b3 to carry out an internal representation or further imaging for the purpose of modelling the human inner ear, which modelling describes the nonlinearities of the human inner ear. For this purpose, functions of the form $x^\alpha$ can be used, for example, $0.1 \alpha <$ holding for the exponent $\alpha$.

The described calculation is undertaken not only for the two original channels k1, k2 of the stereo signal in the first two branches z1, z2, in order to obtain the values x1, x2. Equally, these calculations are carried out for two signals ki1, ki2, affected by coding error, in order to form the output values xi1, xi2, the values affected by coding error being obtained from the two original channels k1, k2 by firstly coding the latter using the type of coding which is applied in the case of greater similarity, this type of coding being the intensity-stereo type of coding in the preferred exemplary embodiment. The coded signals thus obtained by common coding are decoded in a manner known per se using the intensity-stereo method, in order to obtain the signals ki1, ki2 affected by coding error.

Figure 3:
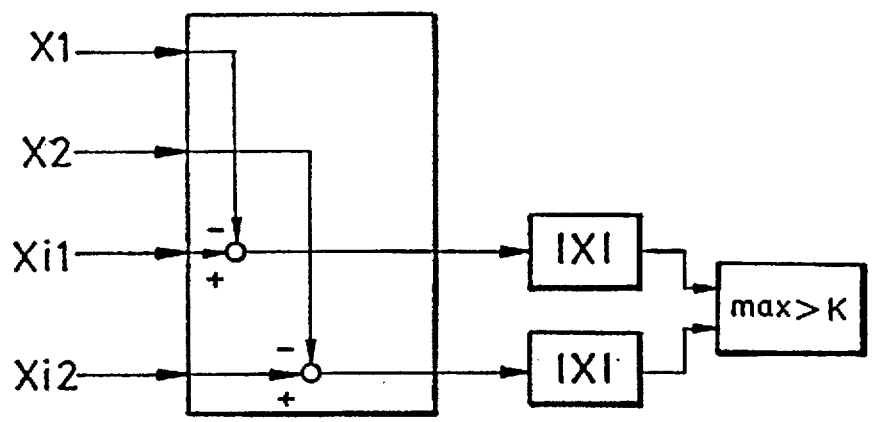
FIG. 3 shows a block diagram of a device for determining the similarity measure on the basis of the output signals of the device in accordance with FIG. 1.
Figure 4:
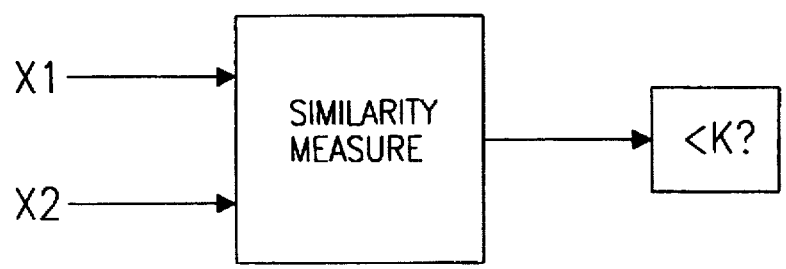
FIG. 4 shows a block diagram of a device for determining the similarity measure on the basis of the output signals of a device in accordance with FIG. 2.
Figure 5:
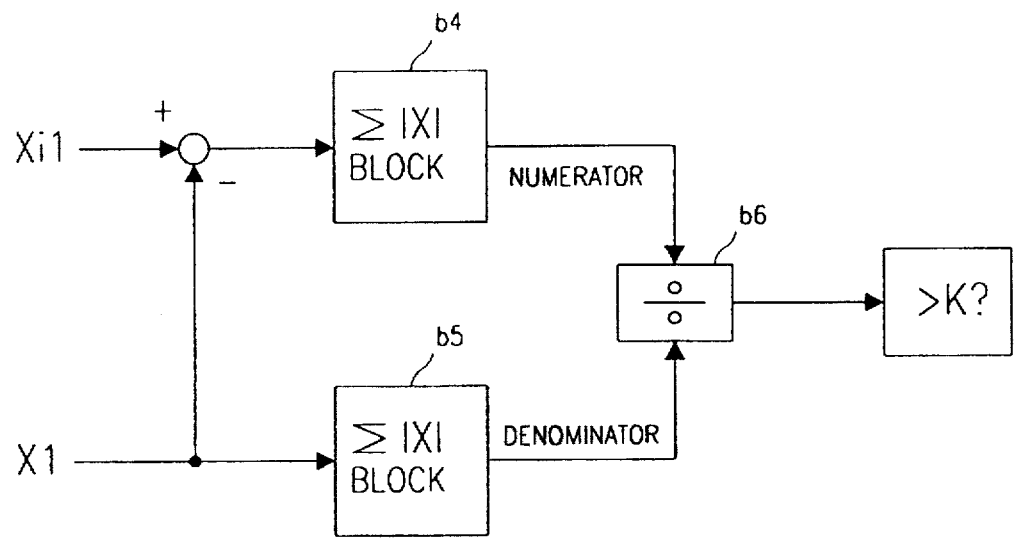
FIG. 5 shows a block diagram, modified by comparison with FIG. 3, of the device for determining the similarity measure on the basis of the output signals of the device in accordance with FIG. 1.
Figure 5:
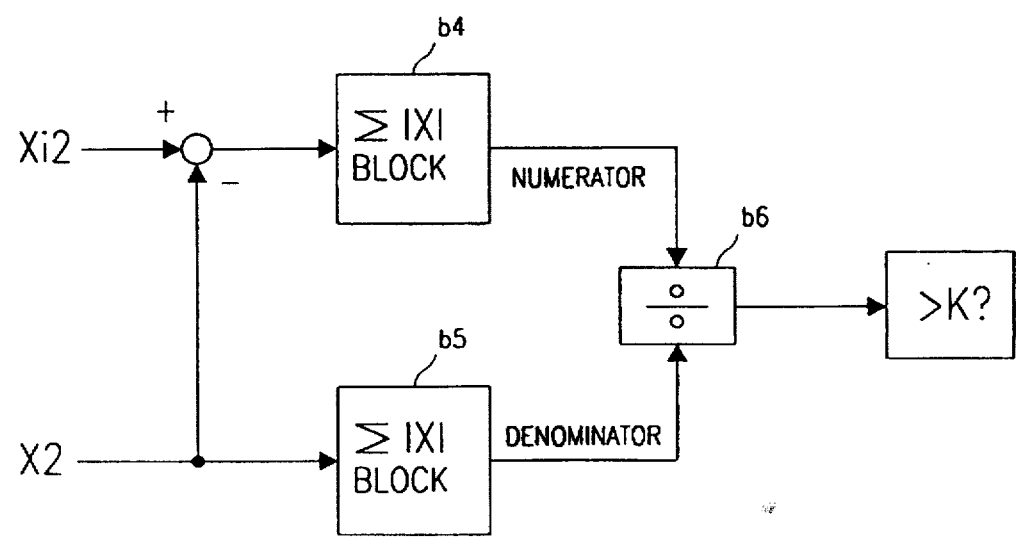

The determination of the similarity measure for selecting the respectively more advantageous type of coding on the basis of the output signals x1, x2, xi1, xi2 can be performed in various ways, as will also be explained by the following description with reference to FIGS. 3 and 5. However, it suffices to evaluate only the similarity of one of the output signals xi1 or xi2 affected by coding error referring to the associated signal x1 or x2 not affected by coding error. The measure of error between these spectral values on the output side, from which the similarity measure can be derived, can be determined in the simplest case by subtraction, although neither is this type of calculation the only possible one.

Figure 1B:
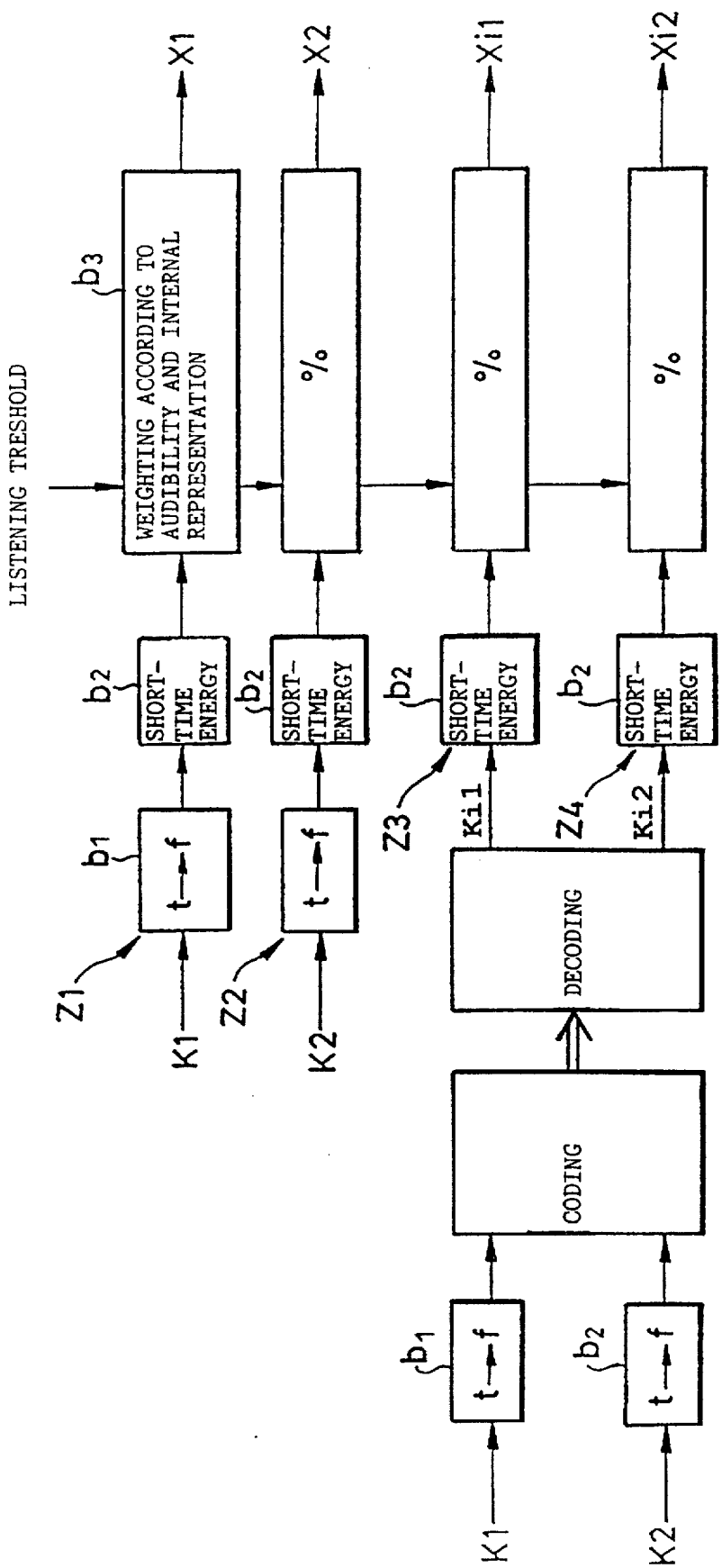
FIG. 1b shows a second exemplary embodiment, modified only slightly by comparison with the first exemplary embodiment, of a device for carrying out essential parts of the method for determining the type of coding to be selected.

FIG. 1b shows a second exemplary embodiment, modified only slightly with respect to the first exemplary embodiment, of a device for carrying out substantial parts of the method for determining the type of coding to be selected. In this exemplary embodiment of the invention, the signals k1, k2 in the third and fourth branches z3, z4 are firstly transformed in the blocks b1 into the frequency domain and not subjected until after their transformation into the frequency domain to that type of coding which is used in the case of the determination of a high similarity measure, and then decoded again in order to generate two signals ki1, ki2 affected by coding error. A listening threshold determined by a psychoacoustic calculation is then used to select or evaluate the respective, actually audible spectral components, starting both from the spectral values xi1, xi2 of the signals ki1, ki2 affected by coding error and from the spectral values of the signals associated with these signals affected by coding error. Subsequently, the similarity measure, on the basis of which one of the at least two types of coding is selected, is calculated on the basis of the audible spectral components, thus selected or evaluated, at least of the signal affected by coding error and of the associated signal.

Figure 2:
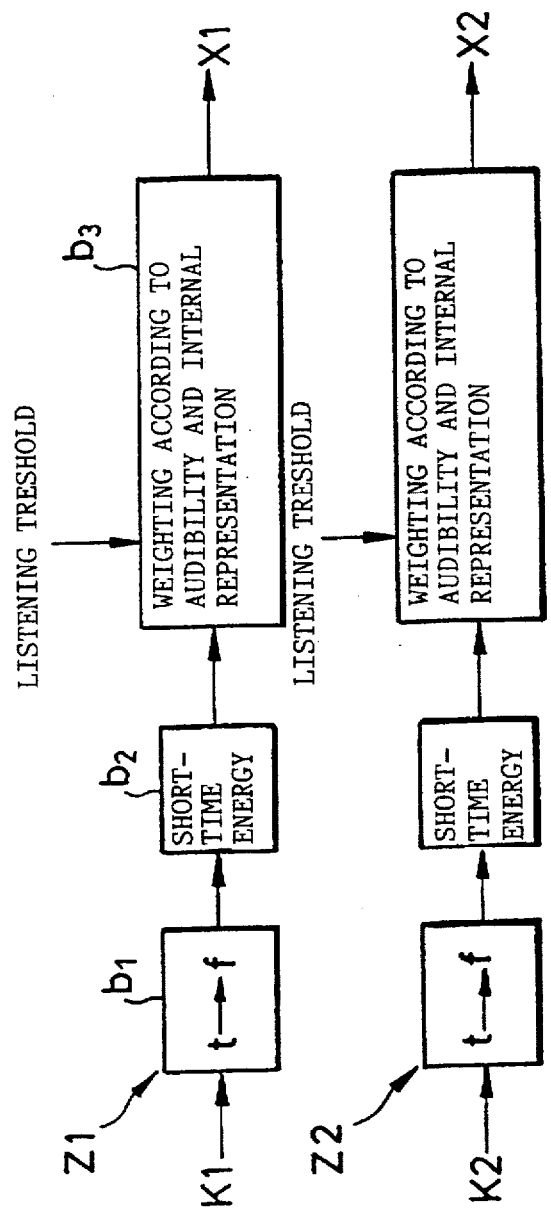
FIG. 2 shows a third exemplary embodiment of a device for carrying out essential parts of the method according to the invention for determining the type of coding to be selected.

A device for determining the similarity measure for the selection of the respectively more suitable coding method in accordance with the third-named method according to the invention is represented in FIG. 2. By comparing FIG. 1a and FIG. 1b, it is seen that the device in accordance with FIG. 2 corresponds identically to the first two branches z1, z2 in accordance with FIG. 1a and FIG. 1b. The third and fourth branches z3, z4 can be eliminated here. Because of the identity of the first two branches z1, z2, there is no need for a renewed explanation of the signal processing carried out by the blocks of these branches. In the device in accordance with FIG. 2, time/frequency transformation and the formation of the short-time energy values and their selection or evaluation are thus used on the basis of the two original channels k1, k2 to obtain the actually audible spectral components x1, x2 of the original channels k1, k2, the measure of the similarity of these actually audible, selected or evaluated spectral components x1, x2 being compared with a threshold value k. If the similarity measure overshoots the threshold value k, that type of coding is selected which is better suited, on the basis of the higher data reduction, for the coding of approximately corresponding stereo signals. In the preferred exemplary embodiment, this can be the intensity-stereo coding method. If the similarity measure is below this threshold value k, the channels are coded separately in the preferred exemplary embodiment.

A possible device for processing the output signals of the devices shown in FIG. 1a and FIG. 1b for carrying out the method according to the invention for determining the type of coding to be selected is represented in FIG. 3. Here, the spectral coding errors x1 minus xi1 and x2 minus xi2, respectively, are respectively compared with a threshold value k. If the two error values x1 minus xi1 and x2 minus xi2, respectively, are below the threshold value k, use is made of the stronger data-reducing method, which in the case of the preferred exemplary embodiment is the intensity-stereo method.

FIG. 5 shows a modified exemplary embodiment of the device for determining the similarity measure in accordance with FIG. 3 on the basis of the output signals of the devices, shown in FIG. 1a and FIG. 1b, for determining the type of coding to be selected. The two mutually corresponding circuit sections respectively comprise a node at which the difference xi1 minus x1 and xi2 minus x2, respectively, is formed for generating a coding-error signal, and two blocks b4, b5 for summing the error signals xi1 minus x1 and xi2 minus x2, respectively, as well as the corresponding useful signals x1 and x2, respectively, via one signal block in each case. After the blockwise absolute summing of these errors and useful signal components, a quotient of the summed absolute error signals is formed in a further block b6 with reference to the summed absolute useful signals and compared with the threshold value k. If the relative measure of error overshoots the threshold k in one of the two channels, no intensity-stereo coding can be undertaken, but a separate coding must be used.

Figure 6:
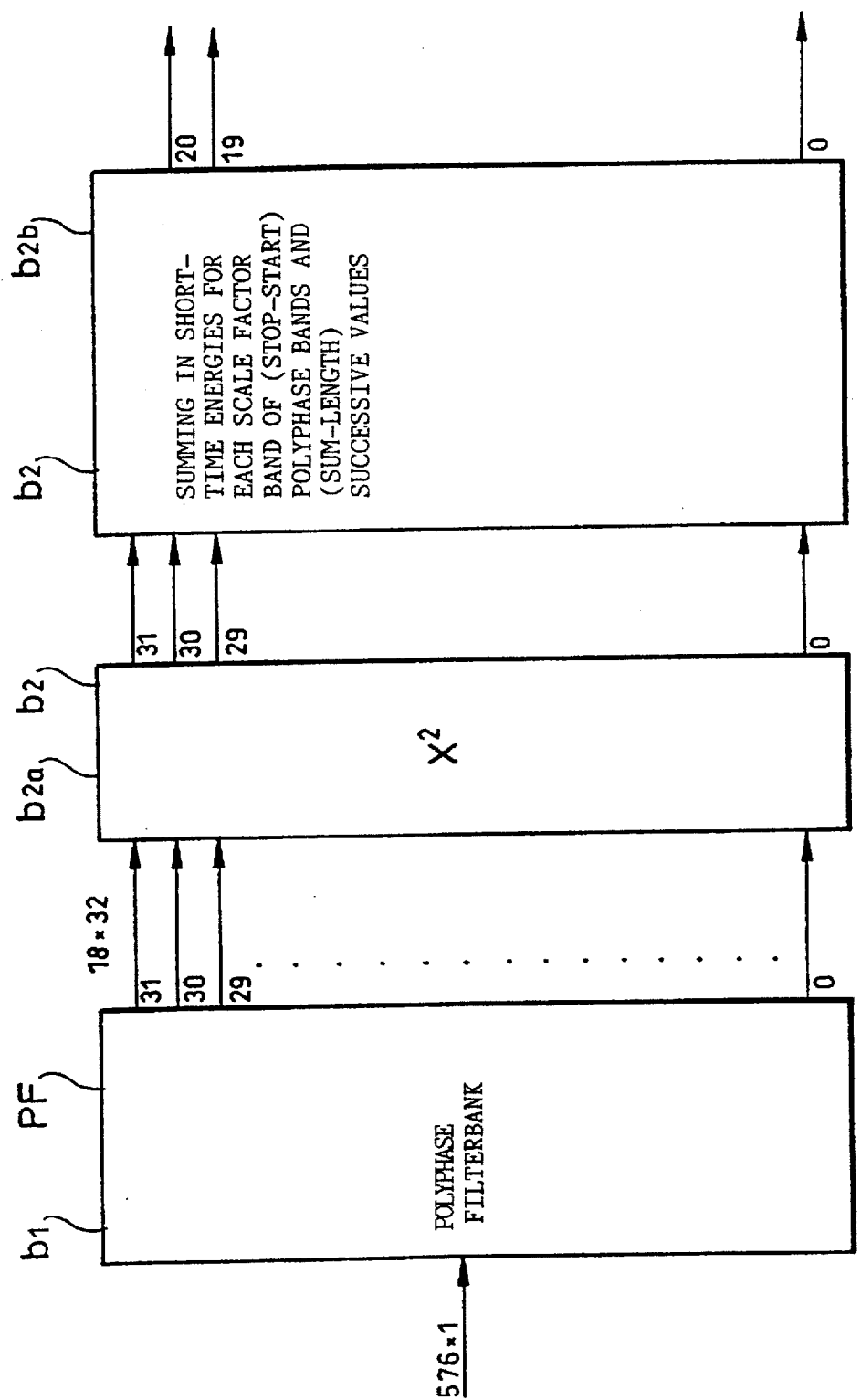
FIG. 6 shows a block diagram to illustrate the structure of the respective first two blocks for each signal in the case of the devices in accordance with FIGS. 1 and 2 for carrying out the time/frequency transformation and determining the short-time energies.

The aim now is to explain with reference to FIG. 6 a possible embodiment of the blocks b1 and b2 of the branches z1, z2 and z1 to z4, respectively, in accordance with FIG. 1a and FIGS. 1b and 2. However, it may already be emphasized at this juncture that both the time/frequency transformation of discrete audio signals and the formation of the short-time energy values are measures which are known to the person skilled in the art from the field of coding, even if not from the field of selection of types of coding.

As is illustrated in FIG. 6, discrete input signals are fed to a polyphase filter bank PF which undertakes a time/frequency transformation of the time- discrete input signal in 32 (0 to 31) "polybands". Reference may be made regarding these bands to FIG. 7, right-hand section "polyphase implementation", left and centre columns. As the person skilled in the art will likewise discern from FIG. 7, the bandwidth for each scale factor band is constant in the case of the scale factor band numbers which are low in terms of frequency, and does not rise until a limiting frequency, in order to simulate the frequency group width and the associated time resolution of the characteristics of human hearing. The spectral values of the 32 polybands (0 to 31) are squared in the block b2a, following the polyphase filter bank b1, to form the energy values. In the block following this, summing is performed, on the one hand, in order to form short-time energies for each scale factor band through the respectively differing summation lengths (compare FIG. 7, right-hand column), the summation lengths (sum. length) respectively designating the number of the successive values to be summed. Furthermore, the 32 polybands are combined to form a reduced number of scale factor bands by combining appropriate frequency bands. In the case of ISO layer III, a total of 21 scale factor bands are selected, the formation of the short-time energies being implemented for each scale factor band by summing the successive values from SB-No. 10.

It was decided not to reproduce a more detailed embodiment of the block b3 in accordance with FIGS. 1 or 2 in FIG. 6, since the weighting of individual spectral values in terms of audibility with the use of a psychoacoustically calculated listening threshold is general specialized knowledge.

Reference is made to the following specialized publication for the purpose of calculating the listening threshold: ISO/IEC 11172 International Standard "Coding of moving pictures and associated audio for digital storage media up to 1.5 Mbit/s", Part 3: Audio, ANNEX D: Psychoacoustic Models.

Reference may be made to the following standard literature insofar as the weighting of the spectral components in terms of audibility and of internal representation is concerned:

John G. Beerends, Jan A. Stemerdink: "A Perceptual Audio Quality Measure based on a Psychoacoustic Sound Representation", J. Audio Eng. Soc., Vol. 40, No. 12, December 1992; and E. Zwicker, H. Fastl: "Psychoacoustics", Springer Verlag, Berlin Heidelberg, 1990, Chapter 8.7.1 "Specific Loudness".

We claim:

1. A method for determining the type of coding to be selected for coding at least two signals, in which a transformation of signals into the frequency domain is carried out and, starting from spectral values, a similarity measure is determined on the basis of which one of at least two types of coding is selected, characterized in that for the purpose of generating at least one signal affected by coding error, at least one of the signals is coded and then decoded in that type of coding which is used in the case of determining a high similarity measure, in that the signal affected by coding error, and the associated signal not affected by the coding error are transformed into the frequency domain, in that, starting both from the spectral values of the signal affected by coding error and from the spectral values of the associated signal not affected by the coding error, a selection or evaluation of the respectively actually audible spectral components is undertaken using a listening threshold determined by a psychoacoustic calculation, and in that the similarity measure is calculated on the basis of the audible spectral components, selected or evaluated in such a way, at least of the signal affected by coding error and the associated signal not affected by the coding error.

2. A method for determining the type of coding to be selected for coding at least two signals, in which a transformation of signals into the frequency domain is carried out and, starting from spectral values, a similarity measure is determined on the basis of which one of at least two types of coding is selected, characterized in that, after its transformation into the frequency domain, for the purpose of generating at least one signal affected by coding error, at least one of the signals is coded and then decoded in that type of coding which is used in the case of determining a high similarity measure, in that, starting both from the spectral values of the signal affected by coding error and from the spectral values of the associated signal not affected by the coding error, a selection or evaluation of the respectively actually audible spectral components is undertaken using a listening threshold determined by a psychoacoustic calculation, and in that the similarity measure is calculated on the basis of the audible spectral components, selected and evaluated in such a way, of at least the signal affected by coding error and the associated signal not affected by the coding error.

3. A method for determining the type of coding to be selected for coding at least two signals, in which a transformation of at least two of the signals into the frequency domain is carried out and, starting from spectral values, a similarity measure for the mutual similarity of these signals is determined on the basis of which one of at least two types of coding is selected, characterized in that starting from the spectral values of the respective signals a selection or evaluation of the actually audible spectral components is undertaken using a listening threshold determined by a psycho-acoustic calculation, and in that the similarity measure is determined on the basis of the audible spectral components, selected or evaluated in such a way, of the at least two signals for the purpose of selecting the type of coding.

4. The method according to one of claims 1 to 3, characterized in that for the purpose of selecting or evaluating the actually audible spectral components of each signal, the short-time energy values within frequency domains which are selected as a function of frequency group widths are first determined, and in that the audible energy values are selected or evaluated from these short-time energy values by comparing them with a calculated listening threshold.

5. The method according to claim 4, characterized in that the short-time energy values are determined for each frequency domain over a period which decreases in accordance with the temporal resolution of the human ear for the frequency domain concerned in the case of increasing frequency group width.

6. The method according to claim 4, characterized in that for the purpose of selecting or evaluating the actually audible spectral values, a function describing the nonlinearities of the human inner ear is applied to the selected or evaluated spectral components.

7. The method according to claim 6, characterized in that the function for describing the nonlinearities of the human ear has the form $x^\alpha$, it holding for the exponent $\alpha$ that: $0.1 < \alpha < 10$.

8. The method according to claim 1 or 2, characterized in that the transformation and selection or evaluation of actually audible spectral components of one signal each, affected by coding error, as well as of the spectral components of one associated signal each is undertaken for each of the channels, and in that the similarity measure is determined on the basis of the respective measures of error for each channel, the measures of error respectively being determined for the respective channel on the basis of the audible spectral components and of the signal affected by coding error, as well as of the associated signal not affected by coding error.

9. The method according to one of claims 1 to 3, characterized in that the similarity measure is compared with a threshold value, and in that a separate coding of the channels is undertaken for the case in which the similarity measure undershoots the threshold value, whereas in other cases an intensity-stereo coding of the channels is undertaken.

* * * * *